United States Patent [19]

Smith

[11] 4,248,531
[45] Feb. 3, 1981

[54] VIDEODISC REPLICATION APPARATUS

[75] Inventor: David S. Smith, Pittsford, N.Y.

[73] Assignee: Eastman Kodak Company, Rochester, N.Y.

[21] Appl. No.: 52,532

[22] Filed: Jun. 27, 1979

[51] Int. Cl.³ ............................................. G03B 27/20
[52] U.S. Cl. ........................................ 355/91; 355/99
[58] Field of Search ...................... 355/87, 91, 99, 102, 355/103, 100

[56] References Cited

U.S. PATENT DOCUMENTS

| | | | |
|---|---|---|---|
| 3,169,465 | 2/1965 | Patterson | 355/91 X |
| 3,320,867 | 5/1967 | Miller | 355/99 X |
| 3,652,158 | 3/1972 | Burgess | 355/91 |
| 3,768,906 | 10/1973 | Michelson et al. | 355/91 X |
| 3,836,252 | 9/1974 | Touchette et al. | 355/100 |
| 3,958,142 | 5/1976 | Seitz | 355/97 X |
| 4,082,454 | 4/1978 | Putnam | 355/97 X |
| 4,105,329 | 8/1978 | Carter et al. | 355/91 |

*Primary Examiner*—Richard A. Wintercorn
*Attorney, Agent, or Firm*—Donald W. Strickland

[57] ABSTRACT

Apparatus and method are disclosed for use in replicating information from a master record carrier, such as a videodisc, onto a replicate material in web form. In a preferred embodiment, the disclosed replication apparatus comprises supply, exposure and takeup chambers. A web cleaning device in the supply chamber cleans the replicate material of foreign particles. In the exposure chamber, the replicate material and a master record carrier are brought into close contact in order to make a contact print exposure. The exposed replicate material is stored in the takeup chamber. One or more sealport devices are provided to maintain certain vacuum conditions in the various chambers of the replication apparatus (1) to degas the replicate material of moisture, (2) to facilitate removal of foreign particles from the replicate material, (3) to facilitate close and uniform contact between the master record carrier and replicate material during the contact print exposure, and (4) to allow exposed replicate material to be removed from the takeup chamber without substantially affecting the vacuum conditions in the rest of the replication machine.

15 Claims, 8 Drawing Figures

VIDEODISC REPLICATION APPARATUS

BACKGROUND OF THE INVENTION

1. Field of the Invention

The present invention relates to the replication of information from a master record carrier onto a replicate material by optical contact printing and, more particularly, to apparatus and method useful for such replication.

2. Description Relative to the Prior Art

A master record carrier, for example a master videodisc, is a high quality recording of video program material. From the master disc, it is desirable to mass produce replicate discs for consumer use. One known method for replicating a videodisc uses a master disc comprised of a thin metal film evaporated onto an optically polished plate-glass disc. Video information is recorded in the master by using a laser beam to selectively melt the metal coating. The master is then coated with a photoresist material which is exposed through the rear of the glass disc. After processing, an array of bumps remains which coincides with the initial array of information holes. This bumpy surface is used to produce a metal stamper, or mold, by much the same techniques as are used in audio record manufacture. Discs are mass produced from the mold by thermoform replication, which generally takes one of three forms: (1) In compression molding, a soft "patty" of warm plastic is placed between the open halves of a mold cavity. The mold is heated and the halves are pressed together forcing the plastic to assume the shape of the cavity. (2) In injection molding, the halves of the mold cavity are first clamped shut, and then hot plastic is injected at high pressure to fill the cavity. (3) In embossing, a preformed sheet of plastic such as polyvinyl chloride is placed in a press and the metal stamper is pressed against the surface of the plastic sheet long enough to transfer the video information.

The above replication process can be simplified by using a photoresist master comprised of a glass disc blank coated with a thin, uniform layer of positive (or negative) photoresist. The photoresist is directly exposed with a laser recording beam, and processing produces an array of pits (or bumps) corresponding to the video information. A metal stamper, or mold, is made from the processed photoresist master and thermoform replication is used to produce replicate discs.

It is apparent that thermoform replication is a relatively complex technique, whether one uses a metal master or a photoresist master. An alternative—and attractive—replication process is optical contact printing. A conventional metal master is used, without modification by photoresist coating, etc., as an optical mask through which a contact print exposure is made. In general, however, optical contact printing is not well suited to the replication of videodiscs for two major reasons: (1) Video information recorded on a videodisc is commonly in the form of an array of elongated circular apertures only a few wavelengths of light in size; diffraction by such apertures causes contact between the master disc and the replicate material to be extremely critical. Even a slight separation occurring between the master disc and the replicate material during exposure will result in a large decrease in the fidelity of the recorded micro-imagery, the size of which should preferably be preserved to within a few percent, i.e., about 20 to 40 angstroms. (2) The standard videodisc is about 30 cm (twelve inches) in diameter and has literally billions of micrometer sized apertures covering the disc, thereby making it necessary to maintain uniform and intimate master-to-replicate contact over the entire image surface—a difficult problem to solve due to the presence of dust, dirt, disc imperfections, etc.

French Patent No. 2,310,586 (and corresponding German Offenlegungsschrift 2,620,283) discloses apparatus for replicating videodiscs onto a diazo material by optical contact printing. In accordance with that teaching, a web of replicate material comprising a diazoic substance on a support is unwound at constant speed. A transparent cylinder rotates on the replicate material as the replicate material is unwound. A flexible master record carrier having video information recorded in the form of spaced apertures is wrapped around the transparent cylinder. A monochromatic, ultraviolet lamp is disposed inside the cylinder along its longitudinal axis and emits radiation through the apertures of the master to expose the diazo layer of the replicate material. French Patent No. 2,310,586 apparently fails to recognize that the replication process is critically sensitive to the presence of foreign particles because there is no provision for cleaning the replicate material of such particles. In addition, the replicate material is at least partially wrapped around the cylinder to drive the cylinder and to contact the master record carrier during the contact print exposure. Such wrapping gives rise to compressive strain along the inside radius of the replicate material that will tend to distort the replicate material as well as causing the replicate material to abrade the master, thereby degrading the replicate image and also causing wear of the master record carrier.

Because of the exacting requirements for videodisc replication, designing and constructing a replication machine suitable for the mass production of replicate videodiscs by contact printing is a formidable problem. Such a machine would have to include apparatus for thoroughly cleaning the replicate material of virtually all foreign particles. Means would also have to be provided for rapidly bringing the master disc into close contact with the replicate material for successive contact print exposures. Further, it has been found that the contacting process must be highly uniform since variations in the intimacy of contact cause objectionable quality variations in the replicated video information. Still further, the replication of videodiscs by optical contact printing is critically sensitive to numerous factors, at least some of which are either not completely understood or are uncontrollable, thereby making the replication process somewhat unpredictable. It is, therefore, highly desirable that means be provided to enable an operator to remove a portion of the exposed replicate material for purposes of monitoring the quality of the replication process, preferably without disturbing the operating conditions in the replication machine.

SUMMARY OF THE INVENTION

In accordance with the present invention, apparatus and method are disclosed for use in the contact print replication of information from a master record carrier, such as a videodisc, onto a replicate material in web form. The present invention is embodied in a videodisc replication machine that includes the following features: (1) Virtually all foreign particles are cleaned from the replicate material prior to replication; (2) The master record carrier is brought into contact with the replicate material for successive contact print exposures; (3) Vacuum conditions are maintained throughout the replication machine to facilitate removal of foreign particles from the replicate material, to degas the replicate material of moisture, and to facilitate close and uniform contact of a master record carrier and the replicate material; and (4) Exposed replicate material can be removed from the replication machine without disturbing the operating conditions in the replicating machine.

In one aspect of the present invention, an exposure chamber has disposed therein means for bringing a replicate material and a master record carrier into contact for a contact print exposure. Means are provided for evacuating the exposure chamber to facilitate close contact between the replicate material and the master record carrier. Also provided is a ported takeup chamber adapted to receive the replicate material from the exposure chamber after a contact print exposure. A sealport device provides selective vacuum isolation of the exposure and takeup chambers, by closing fluid communication therebetween, to enable replicate material to be removed from the takeup chamber without substantially affecting the vacuum condition in the exposure chamber.

In accordance with a second aspect of the invention, a supply chamber is provided that is adapted to receive a material in web form. A web cleaning device is disposed in the supply chamber for cleaning foreign particles from the web material. Means are provided for evacuating the supply chamber to prevent foreign particles removed from the material from drifting about under the influence of air currents and recontaminating the material.

These and other aspects of the invention are described in detail with reference to the drawings.

BRIEF DESCRIPTION OF THE DRAWINGS

In the detailed description of the preferred embodiments of the invention presented below, reference is made to the accompanying drawings, in which:

FIGS. 5a and 5b are detail drawings of a sealport device used in the replication machine of FIGS. 1, 2 and 3, FIG. 5b being a section view along line A—A of FIG. 5a.

DESCRIPTION OF THE PREFERRED EMBODIMENTS

In accordance with the present invention, a videodisc replication machine is provided for replicating video information in web form. By way of overview, the replication machine shown in the drawings generally includes three major sections: (1) a supply chamber wherein the replicate material is degassed and its photosensitive surface cleaned of foreign particles, (2) an exposure station including an exposure chamber (which can be evacuated) containing a pressure platen or other means for bringing the replicate material and the master record carrier into close contact for the contact print exposure, and (3) a takeup chamber for storing exposed replicate material, the takeup chamber being separated from the exposure chamber by a sealport device which, when activated, permits the takeup chamber to be brought up to atmospheric pressure without substantially affecting the operating conditions in the remainder of the replication machine.

The Supply Chamber

Figure 1:
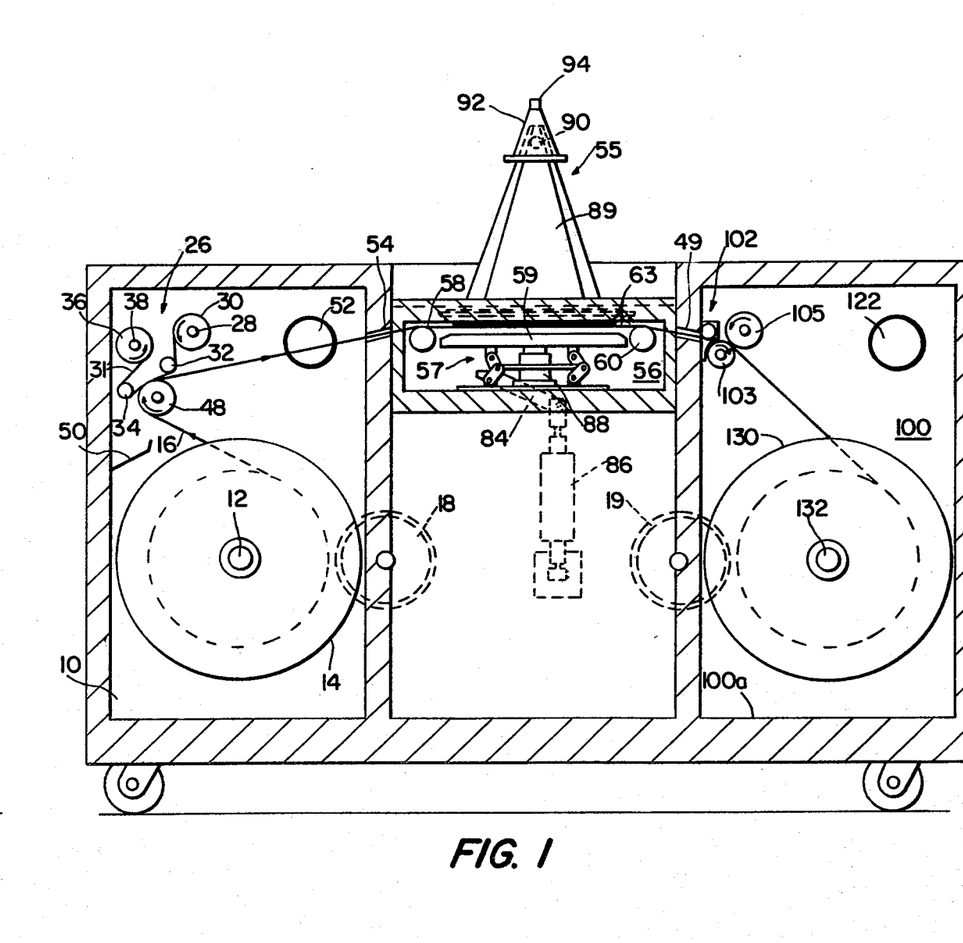
FIGS. 1, 2 and 3 are front sectional, side sectional, and top views respectively of a videodisc replication machine embodying the present invention.
Figure 3:
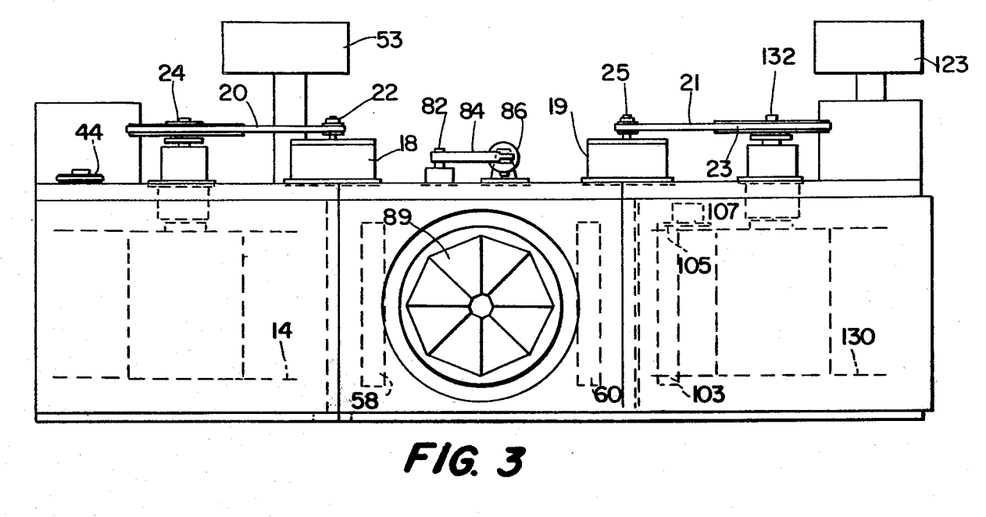

Referring to FIG. 1, a supply chamber 10 contains a spindle 12 for receiving a supply reel 14 of a replicate material 16. The spindle 12 is driven by a torque motor 18 through a belt 20 and pulley 22, 24 arrangement as shown in FIG. 3. A surface of the replicate material 16 will ultimately be pressed into contact with a master record carrier for purposes of contact printing the information on the master to the replicate material. This surface will be referred to as the contacting surface and will usually, but not necessarily, be the photosensitive surface of the replicate material 16. The quality of the contact printing process is dependent, inter alia, upon the closeness of contact maintained between the master device and replicate material during the contact print exposure. Close and uniform contact is especially important when contact printing high frequency information (such as video information carried in the form of micron-sized apertures). For this reason, it is desirable that the contacting surface of the replicate material 16 be cleaned of foreign particles.

To this end, the replicate material 16 passes through a web cleaning device 26. The web cleaning device 26 comprises a spindle 28 which receives a supply reel 30 of open mesh rayon paper 31, or other suitable web cleaning material. The paper web 31 passes over guide rollers 32, 34 and is wound onto a takeup reel 36 mounted on a spindle 38. A motor 40 drives the spindle 38 through a belt 42 and pulley 44, 46 arrangement shown most clearly in FIG. 2. The replicate material 16 passes over a guide roller 48 and contacts the paper web 31. The paper web 31 advances in a direction opposite to that of the replicate material 16 to effect cleaning of its photosensitive surface by a rubbing action. Alternatively, a brush-type cleaner having bristles which have been treated to attract foreign particles could also be used to clean the web surface. Most foreign particles on the replicate material 16 become embedded in the paper web 31. Some foreign particles, however, do not become so embedded and fall toward a collection tray 50. These falling particles present a problem because even slight air currents within the supply chamber 10 can cause the particles to drift around in the chamber 10 and ultimately land back on the replicate material 16. This problem is especially serious if the foreign particles land on that portion of the replicate material that has already passed through the web cleaning device 26 and is being advanced to the exposure station.

In accordance with the present invention, the supply chamber 10 is provided with a vacuum port 52 which is connected to a vacuum pump 53 (see FIG. 3) for evacuating the chamber 10. Were the chamber 10 maintained at a perfect vacuum, each foreign particle dislodged from the replicate material 16 which did not become embedded in the paper web 31 would fall directly onto the collection tray 50 like a "dead weight", i.e., the particle would fall with an acceleration equal to the acceleration due to gravity (ignoring any electrostatic attraction between the replicate material 16 and the foreign particles). Since it is not possible to maintain a perfect vacuum in the chamber 10, some amount of gas pressure will be present. Accordingly, the term vacuum as used herein is intended to encompass a partial vacuum condition.

The maximum permissible amount of gas pressure in the chamber 10 depends upon the maximum size of foreign particle which can be tolerated on the contacting surface of the replicate material 16 (which, in turn, depends upon a plethora of factors such as the desired quality of reproduction, frequency of information to be replicated, etc.). This is because for a given gas pressure within the chamber 10, the larger and heavier particles, affected less by air currents, fall more readily onto the collection tray 50 than do the smaller and lighter particles. As the gas pressure is decreased (the vacuum increased), more of the smaller and lighter particles fall quite readily onto the collection tray 50. In the case of replicating video information in the form of micron sized data bits, virtually all foreign particles having a maximum dimension on the order of a micron or more should be removed from the replicate material 16. (It has been found that foreign particles which have a maximum dimension in the sub-micron range do not adversely interfere with the contact print replication process when the replicate material 16 has a photosensitive surface comprised of a diazotype film emulsion. As disclosed in U.S. Patent Application Ser. No. 891,865, filed Mar. 30, 1978 in the names of Harold T. Thomas and Dennis G. Howe and of common assignee, however, the use of a diazotype replicate material, as well as other types of replicating materials disclosed therein, allows acceptable quality videodisc replicates to be made with less than perfect contact between the master device and the replicate material. It may be the case, therefore, that higher conditions of cleanliness are required when replicating into a material that is not of a type disclosed in U.S. Patent Application Ser. No. 891,865.) Through experimentation it has been determined that a vacuum in the chamber 10 of about 50 to 100 microns Hg is sufficient to permit most particles having a dimension of a micron or more to fall onto the collection tray 50. It will be apparent that this finding is dependent upon many factors such as the type of foreign particles (in particular, the ratio of particle mass to surface area), the configuration of the supply chamber 10 itself, the threading configuration of the replicate material 16, the positioning of the web cleaning device 26, and so on. For any particular supply chamber configuration, and any particular application, the appropriate vacuum level to be maintained in the supply chamber can be readily determined by trial runs at various vacuum levels.

An additional advantage obtained by evacuating the supply chamber is that the photographic speed of the replicate material is made more uniform. Depending upon the history of the replicate material, the moisture content of the photosensitive material may vary considerably, thus affecting certain properties of the sensitized material (e.g., photographic speed). By evacuating the supply chamber, the web of replicate material is caused to outgas, thereby removing substantially all of the free moisture therein irrespective of the initial moisture content. Evacuating the supply chamber, therefore, eliminates a potentially troublesome variable in the replication process, especially for high contrast replicating materials for which exposure is critical.

The replicate material 16 leaves the supply chamber 10 and enters an exposure station through a port 54. At this point, the contacting surface of the replicate material 16 has been generally cleaned of foreign particles and its moisture content has been normalized. It will be apparent that the web cleaning device does not have to be physically located inside the supply chamber; alternatively, it may be located inside the exposure chamber, or elsewhere, so long as the replicate material is cleaned of foreign particles before the contact print exposure.

The Exposure Station

Referring to FIG. 1, the exposure station comprises three main components: (1) a source of radiation 55, (2) an exposure chamber 56 and (3) a pressure platen device 57. The replicate material 16 enters the exposure chamber 56 through the port 54 and is guided over the pressure platen device 57 by a pair of guide rollers 58, 60. The exposure chamber 56 is in fluid communication with the supply chamber 10, via port 54, and is thus maintained at a vacuum level approximately equal to that in the chamber 10. The pressure platen device 57 shown in FIGS. 1, 4a and 4b has a pressure pad assembly 59 which is generally disc shaped, having a diameter of about 35 cm. This configuration matches a master record carrier 63 laminated on a glass support disc 62 that faces the pressure pad assembly 59. The support disc 62 is glued to a metal mounting ring 65 to securely hold the disc 62 in place. An "O" ring 65a provides a seal between the mounting ring 65 and the machine frame. It will be apparent that the present invention is not limited to a particular type of master record carrier, or to a particular configuration of pressure pad or pressure platen device. The only requirement is that the pressure platen device, of whatever type, bring the replicate material and the master record carrier into close contact.

Figure 2:
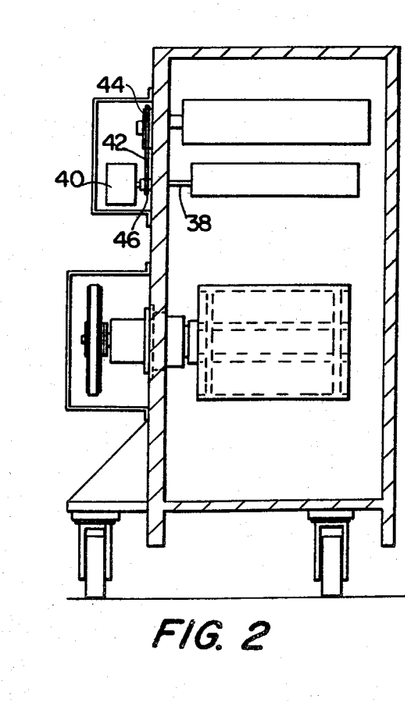
Figure 4A:
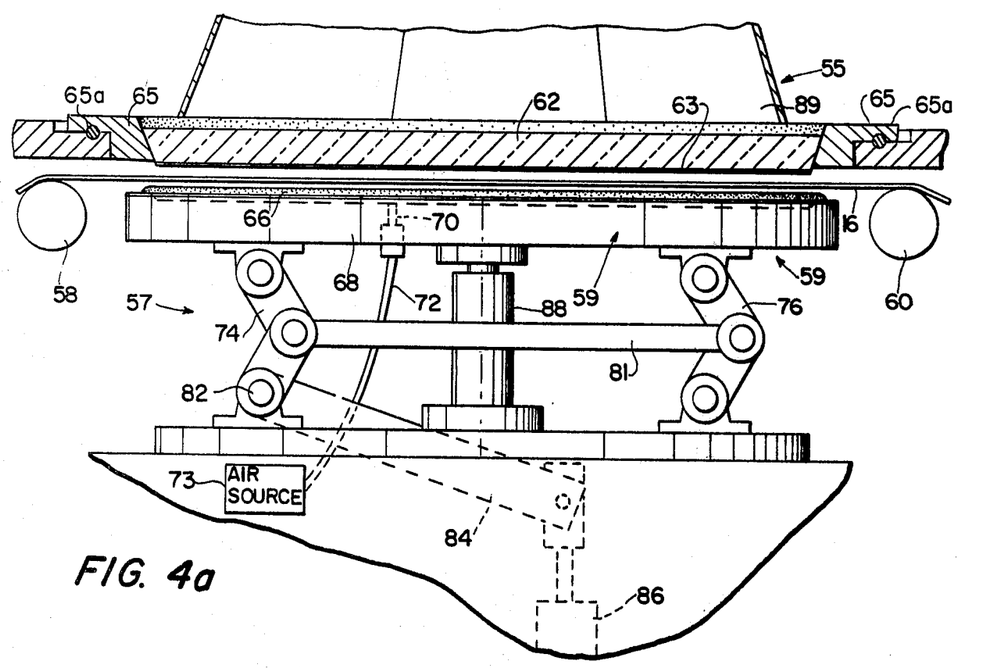
FIGS. 4a and 4b are detail drawings showing certain aspects of an exposure station in the replication machine of FIGS. 1, 2 and 3.
Figure 4B:
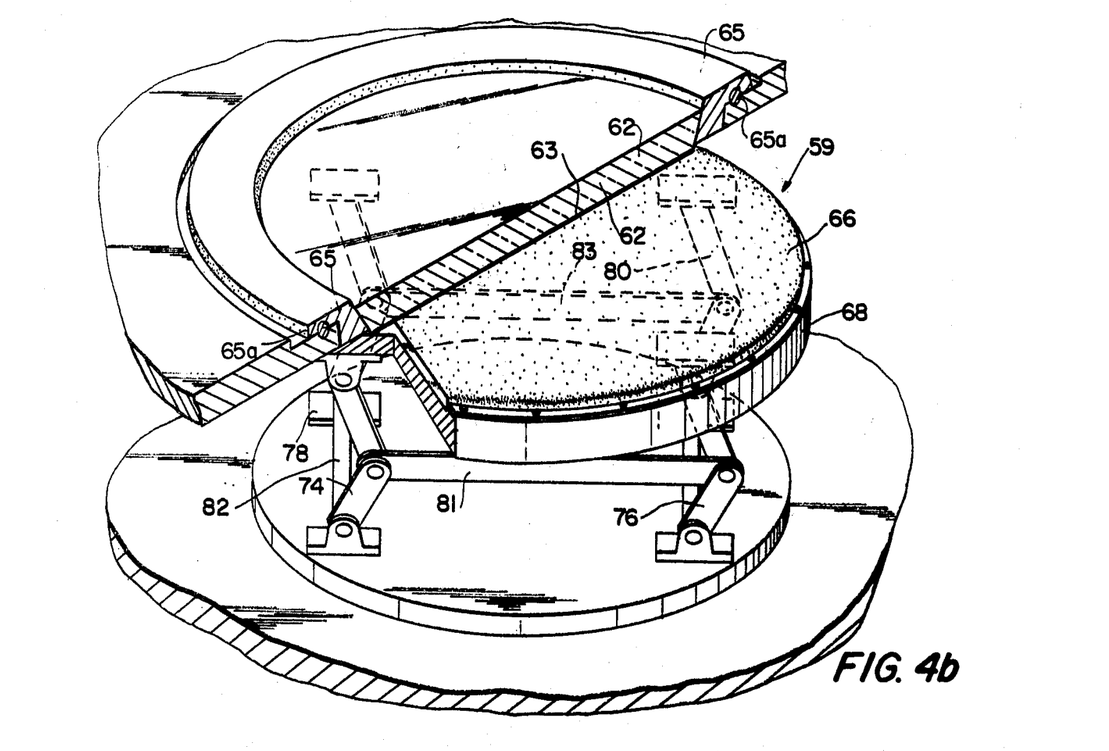

The particular form of pressure platen device used in the replication machine of FIGS. 1, 2 and 3 is shown most clearly in FIGS. 4a and 4b. The pressure pad assembly 59 has a fabric-reinforced rubber diaphragm 66 clamped at the edge to a disc-shaped plate 68. The disc-shaped plate 68 has a port 70 which is connected via supply hose 72 to an external air source 73. A linkage mechanism comprised of four link arrangements 74, 76, 78 and 80, joined by a pair of crosslinks 81 and 83, supports the pressure pad assembly 59. The linkage mechanism is actuated by rotation of a drive shaft 82 by means of a drive arm 84 connected to an air cylinder assembly 86. As shown most clearly in FIG. 1, the air cylinder assembly 86 and the drive arm 84 are external to and mounted on the housing of the replication machine. In response to actuation of the air cylinder assembly 86, rotation of the drive shaft 82 causes the four link arrangements 74, 76, 78 and 80 to drive the pressure pad assembly 59 toward the master record carrier 62. Linear movement of the pressure pad assembly 59 is ensured by the cooperation of a linear guide device 88 with the linkage arrangement. The linkage arrangement drives the pressure pad assembly 59 to touch the underside of the replication material 16 and to press it almost against, or in light contact with, the master record carrier 63. The rubber diaphragm 66 is then inflated to press the photosensitive surface of the replicate material 16 into close contact with the information bearing surface of the master device 63. The vacuum condition maintained in the exposure chamber 56 facilitates such contact.

A source of radiation 55 is then flashed to expose the replicate material 16 through the master record carrier 63 with actinic radiation. The particular radiation source 55 shown in FIGS. 1, 3 and 4a is the subject of U.S. Patent Application Ser. No. 914,105, filed June 9, 1978 in the name of William F. Garbe and is hereby incorporated by reference. Briefly, referring to FIG. 1, the radiation source 55 includes a reflector 89 comprised of a pyramidal arrangement of generally planar reflective surfaces formed, for example, from sheet aluminum. A source such as a xenon flash lamp 90 is disposed within the reflector 89 and positioned so that the reflective surfaces form a spherical array of virtual images of the source. It has been found that such a radiation source satisfactorily exposes the standard, 30 cm diameter master videodisc. Other sources of radiation are also useful with the disclosed replication machine as long as they adequately illuminate the particular master record carrier that is to be replicated.

To facilitate cooling of the radiation source 55, an air cap 92 is provided which fits over, but is spaced from, the apex region of the pyramidal reflector 89. Air is forced under pressure through an inlet port 94. Part of the air flows around the outer surface of the reflector and part provides direct cooling of the lamp 90 envelope.

After the contact print exposure has been made, the rubber diaphragm 66 is deflated and the air cylinder 86 is actuated to lower the pressure pad 59 to its original position. The exposed replicate material 16 is then advanced through a port 49 into a takeup chamber 100.

The Takeup Chamber

Figures 5A, 5B:
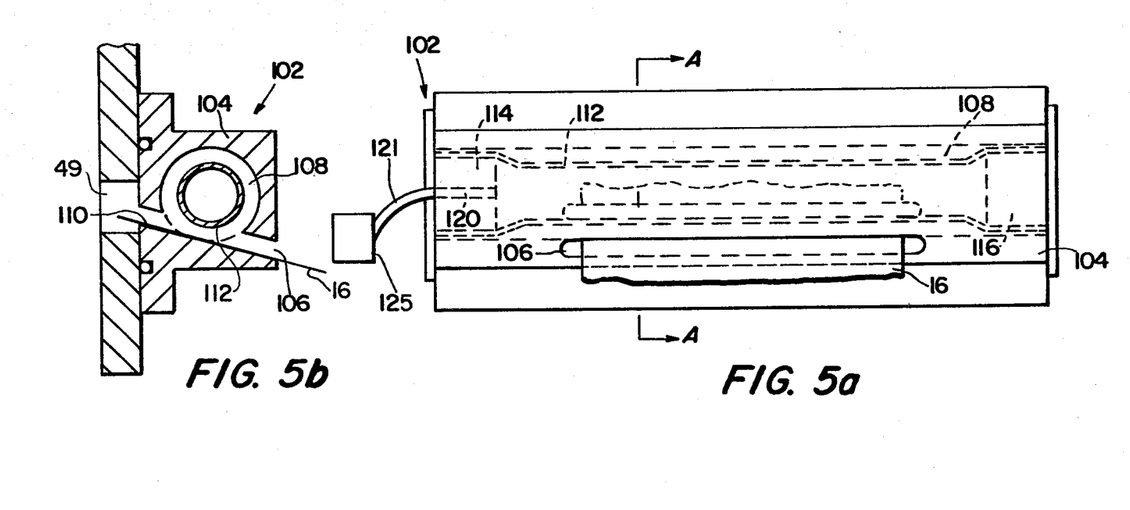

The takeup chamber 100 is isolated from the exposure chamber 56 by a sealport device 102. Referring to FIGS. 5a and 5b, the sealport device 102 is comprised of a housing 104 having a passageway 106 through which the replicate material 16 passes. The passageway 106 includes a cylindrical region 108 extending through the width of the housing and having its longitudinal axis generally perpendicular to the direction of web advancement through the passageway 106. The outer periphery of the cylindrical region 108 is tangent to a surface of the passageway 106, as shown by the dotted lines in FIGS. 5a and 5b. A length of rubber tubing 112 is stretched inside the cylindrical region 108 and is fastened at both ends to cylindrical plugs 114, 116. The rubber tubing 112, in its uninflated state, is smaller in diameter than the cylindrical region 108 so that the web of replicate material 16 does not touch the rubber tubing 112. The cylindrical plug 114 has an air port 120 through which air under pressure flows through an air tube 121 connected to an air source 125 to inflate the rubber tubing 112. The inflated rubber tubing 112 fills the cylindrical region 108 and presses the replicate material 16 against the lower surface 110 of the passageway 106 with sufficient force and over a sufficient area to effectively seal the takeup chamber 100 from the exposure chamber 56, thereby providing vacuum isolation of the two chambers.

The purpose of the sealport device 102 is two-fold. First, it is often desired to open the takeup chamber 100 in order to monitor the quality of the replicated video information. To do this, a section of the exposed replicate material is removed from the takeup chamber 100, processed and examined. Absent the sealport device 102, opening of the takeup chamber 100 would cause the vacuum in the exposure and supply chambers 56 and 10 respectively to be lost. In addition the replicate material 16 would absorb moisture from the air. As a result, when the takeup chamber 100 is closed it would then be necessary to re-evacuate the supply, exposure and takeup chambers 10, 56 and 100. Because of the relatively large volumes involved, and because of outgassing, the re-evacuation would consume considerable time, e.g., about 30 minutes or so, depending upon the capacity of the pumping system. The sealport device 102 permits the takeup chamber 100 to be isolated from the exposure chamber 56 (and thus the supply chamber 10). The takeup chamber 100 can thus be opened, replicate material 16 removed, and the takeup chamber closed without substantially affecting the vacuum condition in the remainder of the replication machine. Before the sealport device 102 is opened, the takeup chamber 100 is re-evacuated through a vacuum port 122 connected to a vacuum pump 123 (see FIG. 3). Alternatively, the takeup chamber 100 could be evacuated through the port 52 in the supply chamber 10, although this procedure would be more time consuming because of path length, and would introduce dirt into the exposure chamber 56 and supply chamber 10.

The second purpose of the sealport device 102 is to prevent foreign particles which enter the takeup chamber 100 during repressurization from contaminating other sections of the replication machine. By evacuating the takeup chamber 100 before opening the sealport device 102, any foreign particles which have entered the takeup chamber 100 are removed or fall to the chamber floor 100a. Foreign particles in the takeup chamber 100 are not nearly so undesirable as in the supply or exposure chambers, however, because the contact print exposure has already been made, and subsequent processing is generally not critically sensitive to foreign particles.

Upon passing through the sealport device 102, the replicate material 16 passes over a roller 103. A wheel 105 contacts the roller 103 and is rotated thereby. The wheel 105 is used to drive a web footage indicator 107 (FIG. 3) to allow accurate positioning of an exposure on the replicate material 16.

In normal operation, the tubing 112 is uninflated to allow advancement of the replicate material 16 through the sealport device 102. When it is desired to open the takeup chamber 100 without affecting the remainder of the replication machine, the rubber tubing 112 is inflated and presses the replicate material 16 against the lower surface 110 of the passageway 106 to form a vacuum seal.

The replicate material 16 is wound onto a reel 130 mounted on a takeup reel spindle 132. A torque motor 19 drives the spindle 132 via a belt 21 and pulley 23, 25 arrangement as shown in FIG. 3. To advance the replicate material 16 from the supply reel 14 to the takeup reel 130, the torques of the supply and takeup spindle drive motors 18 and 19 are adjusted to produce a net positive torque on the takeup spindle 132, so as to accelerate the takeup spindle 132 and takeup reel 130 while maintaining web tension constant. The web tension and the torque of the supply spindle motor 18 together accelerate the supply reel 14. To stop advancement of the replication material 16 while maintaining web tension at the same level, the torque of the supply spindle drive motor 18 is increased to decelerate the supply reel 14, and the torque of the takeup motor 19 is decreased.

Machine Logic

Figure 6:
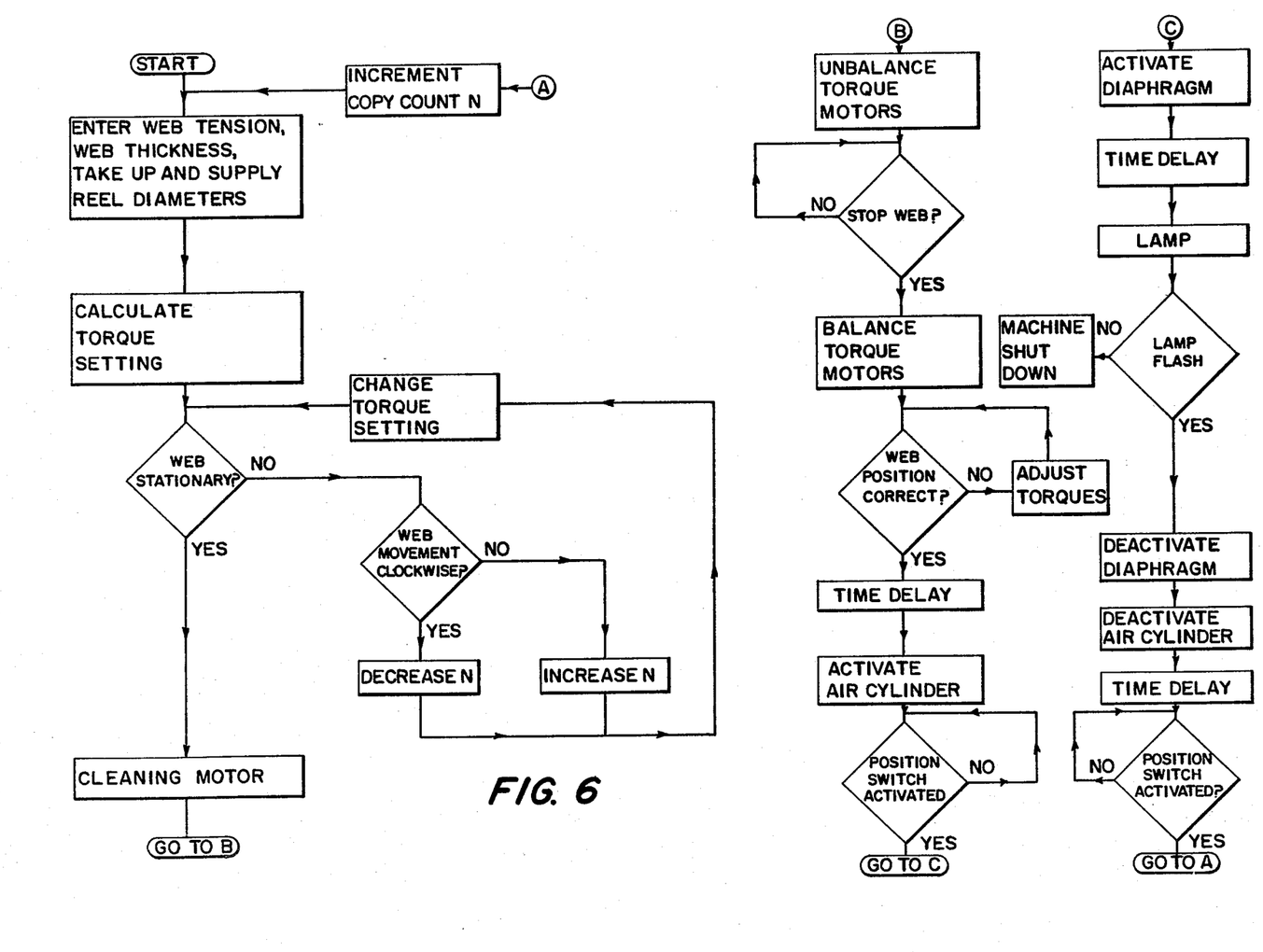
FIG. 6 is a block diagram of a logic circuit that controls certain operating conditions in the replication machine shown in FIGS. 1, 2 and 3.

The various machine functions are automatically controlled by a microprocessor. Referring to FIG. 6, the machine operator enters the desired web tension, the web thickness, and the takeup and supply reel diameters. From these parameters, the microprocessor calculates the initial torque settings of the motors 18, 19 to produce the desired web tension.

Although it is the torque differential which advances the web 16, the absolute torque settings and system inertia control the web tension. If the web tension is too low, indexing problems may occur because the advancing replicate material 16 may not drive the roller 103 which, via the wheel 105, drives the web footage indicator 107. If the torque settings are too high, the web tension will be too great, with the result that the web 16 may slip on the supply and takeup reels causing cinch marks on the photosensitive surface of the replicate material 16.

Upon application of the calculated torques, the state of motion of the web is sensed (by wheel 105, for example). If the web is moving, a parameter N, hereinafter referred to as the "copy count", is decreased or increased depending upon whether the direction of web advancement is toward the takeup reel 130 or the supply reel 14, respectively. (Although the copy count N does not affect the change in torque settings at this point, it will be taken into account by the microprocessor to determine the new torque settings after a contact print exposure has been made.) The torque settings are then adjusted by a fixed, incremental value and the web motion is again sensed. This process is repeated until the web 16 is stationary. (Unless unforeseen system perturbations are present, the initial torque settings calculated by the microprocessor are such that the web 16 will be stationary without the need for adjusting the initial torque settings.) The replication process is now ready to begin.

The cleaner motor 40 is activated and the torque motors are unbalanced to advance the web 16 from the supply reel 14 to the takeup reel 130. The duration of web advancement, and thus the length of advancement, can be determined by counting clock pulses, monitoring edge perforations, using the web footage indicator, etc. To stop web advancement, the torque motors are first unbalanced against the direction of web advancement and then balanced as the web comes to rest. The web position is then sensed to determine if the web is in proper position for exposure. If not, the torque motors are again unbalanced to advance the web one way or the other to the proper position. A time delay, on the order of 100 msec, is provided after final advancement of the replicate material 16 to permit the system to stabilize.

The air cylinder 86 is then activated to move the pressure pad assembly 59 toward the replicate material 16. A position switch (not shown) senses when the pressure pad assembly 59 is in proper position for inflation of the rubber diaphragm 66. The diaphragm 66 is then inflated and a time delay of about 0.5 sec. is provided to permit the system to stabilize. The contact print exposure is now made by activating the flashlamp 90. A sensor may be provided to determine if the lamp has flashed. If not, the machine is automatically shut down. After the contact print exposure, the diaphragm 66 is deflated and the air cylinder 86 is deactivated to return the pressure pad assembly 59 to its initial position. After the pressure pad assembly 59 reaches its initial position, a time delay of about 0.5 sec. is provided to allow the system to stabilize. Upon sensing that the pressure pad assembly 59 has returned to its initial position, the copy count N is incremented. The new copy count tells the microprocessor that a certain amount of replicate material 16 has been advanced from the supply reel 14 to the takeup reel 130, and thus allows the microprocessor to calculate the new torque settings required to maintain the desired web tension. (It will be recalled that the copy count N was incremented if the web was moving after application of the initial torque settings. Since the new torque settings calculated after advancement of the replicate material depend upon the copy count N, any unforeseen system perturbations are compensated.)

The invention has been described in detail with particular reference to preferred embodiments thereof, but it will be understood that variations and modifications can be effected within the spirit and scope of the invention. For example, the web cleaning device shown in FIG. 1 removes foreign particles from the photosensitive (contacting) surface of the replicate material. The web cleaning device could also be arranged to remove foreign particles from the opposite surface of the replicate material. By adding a second web cleaning unit, or by providing a different type of web cleaning unit, both surfaces of the replicate material can be cleaned. Further, depending upon the number, size and type of foreign particles in the supply roll of replicate material, it may be desirable to increase the cleaning action of the web cleaning unit. This can be done by increasing the tension of the web cleaning material.

Still further, in some applications it may be desirable to isolate the exposure chamber from the supply chamber as well as the takeup chamber by means of a sealport device. In this case, only the exposure chamber need be evacuated. In operation, the replicate material is advanced to the exposure station for a contact print exposure. Both sealport devices are then actuated to provide vacuum isolation of the exposure chamber from the supply and takeup chambers. The exposure chamber is then evacuated, the replicate material and the master record carrier are brought into close contact, and the contact print exposure is made. The sealport devices are deactivated to permit the replicate material to be advanced for the next contact print exposure.

What is claimed is:
1. Apparatus for use in the photographic replication of information from a master record carrier onto a replicate material in web form, said apparatus comprising:
   (a) means defining an exposure chamber;
   (b) means for bringing a replicate material and a master record carrier into contact within said exposure chamber for a contact print exposure;
   (c) means for evacuating said exposure chamber to facilitate contact between the replicate material and the master record carrier;
   (d) means defining a ported takeup chamber adapted to receive the replicate material from said exposure chamber after a contact print exposure; and
   (e) means for selectively closing fluid communication between said exposure chamber and said takeup chamber when access to the takeup chamber is desired.

2. Apparatus as claimed in claim 1 further comprising means forming a supply chamber for the replicate material and having a port through which the replicate material passes into the exposure chamber, and wherein said evacuating means evacuates said supply chamber to degas the replicate material before contact print exposure.

3. Apparatus as claimed in claim 2 further comprising a web cleaning device for cleaning foreign particles from the replicate material prior to contact with the master record carrier to facilitate close and uniform contact between the replicate material and the master record carrier.

4. Apparatus for use in the photographic replication of information from a master record carrier onto a replicate material in web form, said apparatus comprising:
   (a) means defining a supply chamber adapted to receive a web of replicate material;
   (b) a web cleaning device disposed in said supply chamber for cleaning foreign particles from the replicate material;
   (c) means defining an exposure chamber having a port through which the replicate material passes from said supply chamber and including in the exposure chamber means for bringing the cleaned replicate material and a master record carrier into contact during print exposure;
   (d) means for evacuating said exposure chamber to facilitate contact between the replicate material and the master record carrier and for evacuating said supply chamber to facilitate removal of foreign particles from the replicate material without redeposition of such removed particles onto the replicate material;
   (e) means defining a ported takeup chamber adapted to receive the replicate material from said exposure chamber; and
   (f) means for selectively closing fluid communication between said exposure chamber and said takeup chamber so that said takeup chamber can be opened without substantially affecting the vacuum condition within said exposure chamber.

5. Apparatus for use in the photographic replication of information from a master record carrier onto a replicate material in web form, said apparatus comprising:
   (a) means defining a supply chamber adapted to receive a web of replicate material;
   (b) a web cleaning device disposed in said supply chamber for cleaning foreign particles from the replicate material;
   (c) means defining an exposure chamber for receiving the cleaned replicate material, said exposure chamber being in fluid communication with said supply chamber and having disposed therein means for bringing the cleaned replicate material and a master record carrier into contact for a contact print exposure;
   (d) means for evacuating said supply and exposure chambers;
   (e) means defining a takeup chamber adapted to receive the exposed replicate material from said exposure chamber; and
   (f) a sealport device for selectively closing fluid communication between said exposure chamber and said takeup chamber.

6. Apparatus as claimed in claim 5 wherein said web cleaning device includes a cleaning material and means for rubbing the surface of the replicate material with the cleaning material to remove foreign particles from the replicate material.

7. Apparatus as claimed in claim 5 wherein said web cleaning device comprises means for advancing a web cleaning material relative to, and in contact with, a surface of the replicate material to remove foreign particles from such surface of the replicate material.

8. Apparatus as claimed in claim 5 wherein said sealport device comprises:
   a housing having a passageway which interconnects said exposure chamber and said takeup chamber and through which the replicate material passes; and
   an inflatable element arranged to seal upon inflation the replicate material against said housing and to thereby close said passageway.

9. Apparatus as claimed in claim 8 wherein said passageway includes a substantially cylindrical region having its longitudinal axis generally perpendicular to the direction of advancement of the replicate material through said passageway, and wherein said inflatable element comprises an inflatable rubber tube disposed within said cylindrical region of said passageway, whereby inflation of said rubber tube expands the tube into sealing engagement with said housing to close fluid communication between said exposure chamber and said takeup chamber.

10. Apparatus as claimed in claim 9 and further comprising plugs mounted in the opposed ends of said tube to seal the tube against leakage and wherein one of said plugs has a port for the admission of an inflating fluid.

11. Apparatus as claimed in claim 5 further including means for evacuating said takeup chamber, prior to opening the sealport device and placing the exposure and takeup chambers in fluid communication.

12. Apparatus as claimed in claim 5 wherein said means for bringing the replicate material and the master record carrier into close contact comprises:
   a pressure pad for engaging said replicate material; and
   mounting means for selectively moving said pressure pad into contact with said replicate material to press the replicate material against the master record carrier.

13. Apparatus for use in the photographic replication of information from a master record carrier onto a replicate material in web form, said apparatus comprising:
   (a) means defining a supply chamber adapted to receive a web of replicate material;
   (b) means defining an exposure chamber adapted to receive a section of the replicate material from said supply chamber, said exposure chamber having disposed therein means for bringing said section of replicate material into contact with a master record carrier during photographic print exposure;
   (c) means for evacuating said exposure chamber and said supply chamber to degas the replicate material and to facilitate close contact of said section of replicate material and the master record carrier during such exposure;
   (d) means defining a takeup chamber adapted to receive said section of replicate material from said exposure chamber after exposure therein; and
   (e) means for selectively closing off fluid communication between said exposure chamber and said supply chamber and said takeup chamber.

14. Apparatus as claimed in claim 13 further comprising a web cleaning device disposed in said supply chamber for cleaning foreign particles from the replicate material.

15. Apparatus as claimed in claim 13 further comprising a web cleaning device disposed in said exposure chamber for cleaning foreign particles from the replicate material prior to the print exposure.

* * * * *